United States Patent
Harrison et al.

(10) Patent No.: US 8,047,181 B2
(45) Date of Patent: Nov. 1, 2011

(54) SPEED AND POSITION SENSING DEVICE FOR EMD TWO-CYCLE DIESEL ENGINES

(75) Inventors: Edward H. Harrison, Goodland, FL (US); Keith Mulder, Naples, FL (US); Edward A Schlairet, Naples, FL (US)

(73) Assignee: Haynes Corporation, Naples, FL (US)

( * ) Notice: Subject to any disclaimer, the term of this patent is extended or adjusted under 35 U.S.C. 154(b) by 0 days.

(21) Appl. No.: 13/029,506

(22) Filed: Feb. 17, 2011

(65) Prior Publication Data
US 2011/0197441 A1    Aug. 18, 2011

Related U.S. Application Data

(63) Continuation of application No. 12/622,815, filed on Nov. 20, 2009, now Pat. No. 7,905,220, which is a continuation-in-part of application No. 12/496,219, filed on Jul. 1, 2009.

(51) Int. Cl.
*G01L 3/00* (2006.01)

(52) U.S. Cl. ........... 123/406.58; 123/406.59; 73/114.25; 73/114.26

(58) Field of Classification Search ............. 123/90.27, 123/90.31, 350, 406.58, 406.59; 73/117.25, 73/114.26, 114.27, 114.28
See application file for complete search history.

(56) References Cited

U.S. PATENT DOCUMENTS

| | | | |
|---|---|---|---|
| 3,203,274 A * | 8/1965 | Barth et al. ........... | 74/604 |
| 4,445,337 A * | 5/1984 | McCreary ........... | 60/608 |
| 4,866,381 A | 9/1989 | Tatsuhiko | |
| 5,014,655 A * | 5/1991 | Ampferer ........... | 123/90.31 |
| 5,165,271 A * | 11/1992 | Stepper et al. ........... | 73/114.27 |
| 6,325,050 B1 | 12/2001 | Gallagher et al. | |
| 6,405,705 B1 | 6/2002 | Dunsworth et al. | |
| 6,467,452 B1 | 10/2002 | Duffy et al. | |
| 6,814,060 B1 | 11/2004 | Solomons et al. | |
| 6,866,028 B2 | 3/2005 | Mahakul et al. | |
| 7,036,473 B1* | 5/2006 | Goracy ........... | 123/90.27 |
| 7,073,481 B2 | 7/2006 | Glenn et al. | |
| 7,370,627 B2 | 5/2008 | Mahakul et al. | |
| 2005/0166878 A1* | 8/2005 | Hartley ........... | 123/90.31 |
| 2006/0096273 A1 | 5/2006 | Soliman et al. | |
| 2010/0258087 A1 | 10/2010 | Dixon et al. | |

* cited by examiner

*Primary Examiner* — Stephen K Cronin
*Assistant Examiner* — Raza Najmuddin
(74) *Attorney, Agent, or Firm* — Porter, Wright, Morris & Arthur, LLP

(57) ABSTRACT

A device is disclosed for sensing the speed of an EMD 567/645/710 two-cycle diesel engine having a crankcase, electronic fuel injectors and an electronic control system for controlling the electronic fuel injectors. The device includes a spline shaft sized for insertion into the crankcase of the engine so that the spline shaft rotates with the engine, a gear operably secured to the spline shaft to rotate with the spline shaft and sized to rotate with the engine in a 1:1 ratio, and at least one electronic sensor located adjacent the gear to sense rotation of the gear. The at least one electronic sensor is connectable to the electronic control system to provide electronic signals to the electronic control system for determining when to inject fuel with the electronic fuel injectors. Also disclosed is a method for retrofitting the engine and a kit for retrofitting the engine.

18 Claims, 18 Drawing Sheets

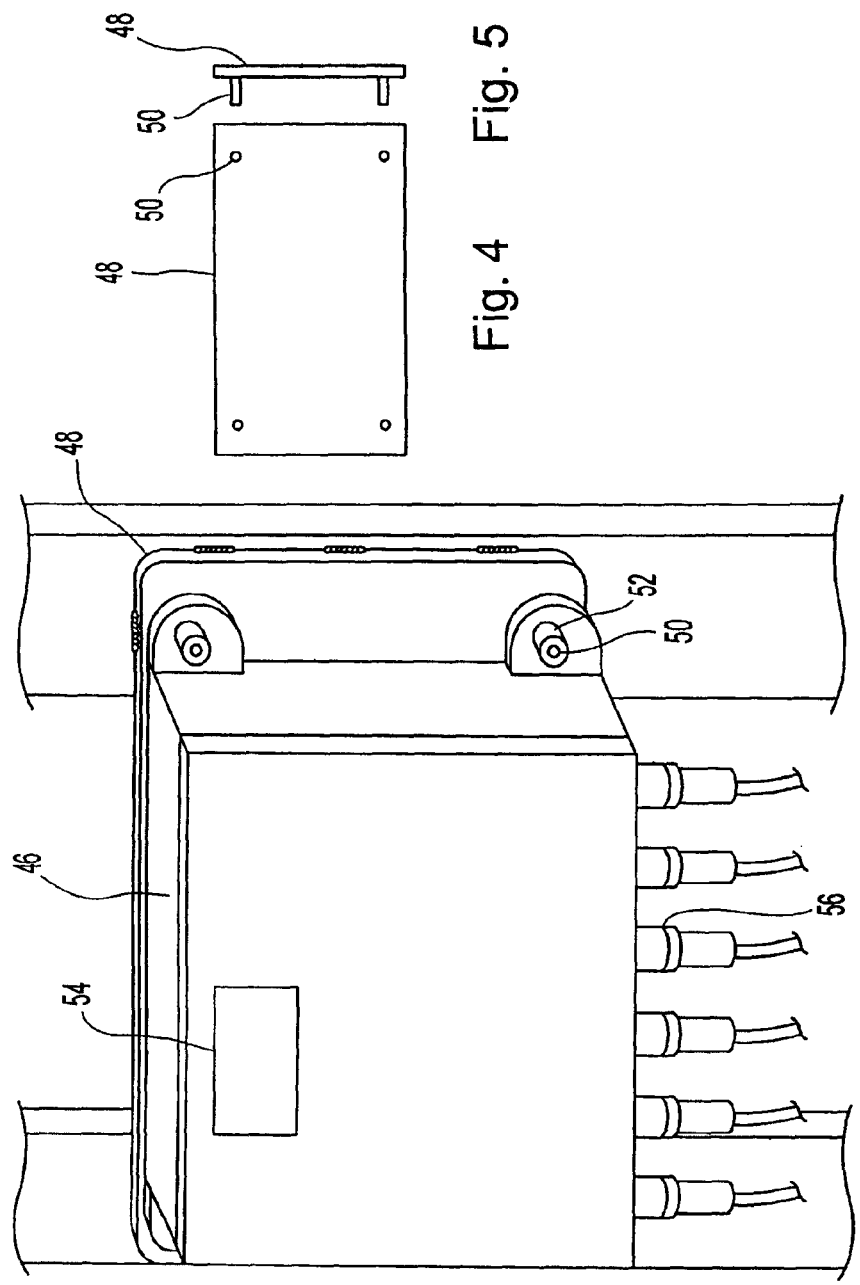

SPEED AND POSITION SENSING DEVICE FOR EMD TWO-CYCLE DIESEL ENGINES

CROSS-REFERENCE TO RELATED APPLICATIONS

This application is a continuation of U.S. patent application Ser. No. 12/622,815 filed on Nov. 20, 2009 now U.S. Pat. No. 7,905,220 which is a continuation-in-part of U.S. patent application Ser. No. 12/496,219 filed on Jul. 1, 2009, the disclosures of which are expressly incorporated herein in their entireties by reference.

STATEMENT REGARDING FEDERALLY SPONSORED RESEARCH

Not Applicable

REFERENCE TO APPENDIX

Not Applicable

FIELD OF THE INVENTION

The field of the present invention generally relates to two-cycle diesel engines produced by the Electro-Motive Division (EMD) of General Motors Corporation and, more particularly, to monitoring the engine speed and position for such engines.

BACKGROUND OF THE INVENTION

As part of the U.S. Environmental Protection Agency's (US EPA) ongoing National Clean Diesel Campaign, the EPA has adopted new standards that dramatically reduce emissions of nitrogen oxide ($NO_x$), diesel particulate matter (PM), unburned hydrocarbon (HC), and carbon monoxide (CO) from locomotive and marine diesel engines. Engines produced from 2005 to 2010 must meet US EPA Tier 2 standards, while engines produced from 2011 to 2014 must meet US EPA Tier 3 standards and engines produced from 2015 and beyond must meet US EPA Tier 4 standards. It is noted that engines produced prior to 1973 were uncontrolled while engines produced from 1973 to 2001 were required to meet US EPA Tier 0 standards and engines produced from 2002 to 2004 were required to meet US EPA Tier 1 standards.

While these EPA standards primarily relate to new and remanufactured engines, there is increasing pressure to reduce emissions of all existing non-road diesel engines. Eventually, all existing locomotive engines produced prior to 1973 must meet the US EPA Tier 0 standards and potentially even lower emission levels. For locomotives operating in specific emissions-regulated locations including California and Texas, emission levels must be reduced further with agreements to encourage the use of engines that meet the US EPA Tier 2 standards.

EMD produced more than 70,000 engines and has the largest installed base of diesel-electric locomotives in both North America and internationally. Among the two-cycle diesel engines produced by EMD are the EMD 567 series which was produced from 1938 until 1966 and the EMD 645 series which was produced from 1965 until 1988. The EMD 710 series which was produced from 1985 and is still produced currently. The EMD 567/645/710 engines can be used for long periods of time due to their ability to be repeatedly repaired/overhauled and the high cost of newly purchased engines.

There is a large population of EMD 567/645/710 engines in service that have not reached the end of their useful life—a unique feature of this engine segment compared to smaller engine models. Some existing engines may exceed fifty years of age. Because of the emission standards, however, the owners of these EMD 567/645/710 engines are faced with the option of either overhauling or rebuilding the engines to meet the newer emission standards or retiring the engines early and purchasing new technology engines that meet the current emission standards. As a result, the owners of these engines stand to incur a heavy financial loss. Accordingly, there is a need for a cost effective system and method for extending the useful life of these two-cycle diesel engines without requiring an expensive overhaul or new replacement engine.

One method for reducing the emissions on these engines involves the installation of electronic fuel injection. The current system utilizes mechanical injection where the injection is determined based on machined dimensions that are fixed, and do not vary during the use of the product. Electronic injection allows flexibility by varying the injection based on numerous inputs. Some of these inputs may include ambient temperature, altitude, geographic location, and so forth. Since the injectors are no longer fixed mechanically they require input from the engine as to the speed and position of the drive-train to determine with accuracy the time to begin, hold, and end, injection. New engines with electronic fuel injection incorporated in to the design utilize the flywheel for the monitoring and measurement of speed and RPM. The utilization of a once per revolution sensor to sense the absolute position, and then the monitoring of the flywheel teeth for synchronizing the position during the revolution is done utilizing two sensors on the flywheel. The concern with this prior art is that the sensors have a history of being damaged and moved due to their location in an area of the engine that is frequently accessed by mechanics. Accordingly, there is a need for an accurate device for monitoring and measuring the speed and position of these two-cycle diesel engines that can be easily installed in a retrofit or new application and in a position for reliable operation.

SUMMARY OF THE INVENTION

The present invention provides a method and device which overcomes at least some of the above-noted problems of the related art. Disclosed is a device for sensing the speed of an EMD 567/645/710 two-cycle diesel engine having a crankcase, electronic fuel injectors and an electronic control system for controlling the electronic fuel injectors. The device includes a shaft sized for connection to the crankshaft of the engine so that the shaft rotates with the engine, a gear operably secured to the shaft to rotate with the shaft and sized to rotate with the engine in a 1:1 ratio, and at least one electronic sensor located adjacent the gear to sense rotation of the gear. The at least one electronic sensor is connectable to the electronic control system to provide electronic signals to the electronic control system for determining when to inject fuel with the electronic fuel injectors.

Also disclosed is a kit for reducing exhaust emissions from an existing EMD 567/645/710 two-cycle diesel engine by retrofitting the engine from mechanical fuel injection to electronic fuel injection. The kit includes a plurality of electronic unit fuel injectors, an electronic control module to be electrically connected to the electronic unit fuel injectors for delivering injection signals to the electronic unit fuel injectors, and a device for sensing speed of the engine. The device includes a shaft sized for connection to a crankshaft of the engine so that the shaft rotates with the engine, a gear operably secured to the shaft to rotate with the shaft and sized to rotate with the engine in a 1:1 ratio, and at least one electronic sensor located adjacent the gear to sense rotation of the gear. The at least one electronic sensor is connectable to the electronic control module to provide electronic signals to the electronic control module for determining when to inject fuel with the electronic unit fuel injectors.

Also disclosed is a method for retrofitting an EMD 567/645/710 two-cycle diesel engine to reduce exhaust emissions. The method includes the steps of removing a governor angle drive housing from the engine and securing a device for sensing speed of the engine at a governor angle drive location of the engine. The device for sensing speed of the engine includes a shaft sized for connection to a crankshaft of the engine at the governor angle drive location of the engine so that the shaft rotates with the engine, a gear operably secured to the shaft to rotate with the shaft and sized to rotate with the engine in a 1:1 ratio, and at least one electronic sensor located adjacent the gear to sense rotation of the gear.

From the foregoing disclosure and the following more detailed description of various preferred embodiments it will be apparent to those skilled in the art that the present invention provides a significant advance in the technology and art of two-cycle diesel engines. Particularly significant in this regard is the potential the invention affords for providing a cost effective, reliable, and accurate device for monitoring and measuring the speed and/or position of two-cycle diesel engines without requiring an expensive overhaul or new replacement engine. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 3 is a fragmented, perspective view of an electronic control module of the retrofitted engine of FIG. 2;

FIG. 4 is a front elevation view of a mounting plate for the electronic control module of FIG. 3;

FIG. 5 is a side elevational view of the mounting plate of FIG. 4;

Figure 1:
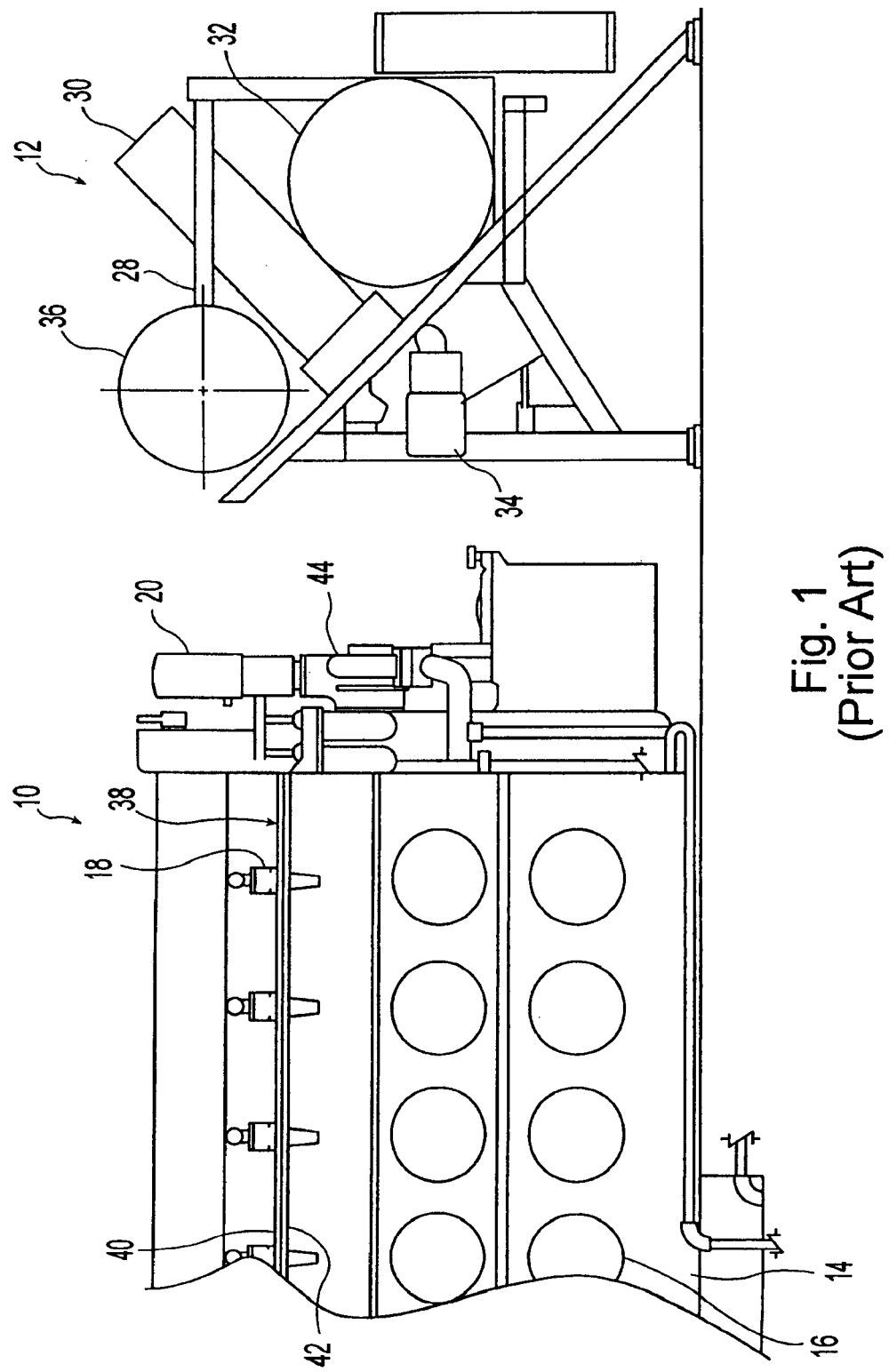
FIG. 1 is a diagrammatic view of a two-cycle diesel engine having a mechanical fuel injection system.

It should be understood that the appended drawings are not necessarily to scale, presenting a somewhat simplified representation of various preferred features illustrative of the basic principles of the invention. The specific design features of retrofitted two-cycle diesel engines as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the adjustable control pedal assemblies illustrated in the drawings. In general, up or upward refers to an upward direction within the plane of the paper in FIG. 1 and down or downward refers to a downward direction within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved systems and methods disclosed herein. The following detailed discussion of various alternative and preferred embodiments will illustrate the general principles of the invention with reference to an EMD 16-645E Roots-blown engine. Other embodiments suitable for other applications will be apparent to those skilled in the art given the benefit of this disclosure.

Referring now to the drawings, FIG. 1 shows an existing or in-use two-cycle mechanically-injected diesel engine 10 having and an associated equipment rack 12 which supports a collection of components that serve the engine 10. The illustrated engine 10 is an EMD 16-645E Roots-blown engine but it is noted that any other EMD 547/645 two-cycle mechanically-injected diesel engine can be retrofitted according to the present invention. The term "retrofit" is used in this specification and the claims to mean the modification of an engine in its pace of use without removal as required for an overhaul or rebuild.

The illustrated engine 10 has an engine block 14 with sixteen cylinders—two rows of four cylinders 16 on each side. The illustrated engine 10 includes mechanical fuel injectors 18 for injecting fuel into the cylinders 16, a mechanical governor 20 for controlling the fuel flow from the mechanical fuel injectors 20, a rack and associated linkage 22 connecting the governor 20 to the mechanical fuel injectors 18, an over speed trip linkage and lay shaft assembly 24 for controlling the rack 22 of the fuel injectors 18, and a mechanical load regulator assembly 26 for setting a governor excitation voltage.

The illustrated equipment rack 12 includes a support structure 28, a lubrication oil cooler 30 supported by the structure 28, a lubrication oil filter 32 supported by the structure 28, a fuel pump 34 supported by the structure 28, and an engine coolant expansion tank 36 supported by the structure 28. Lubrication oil flows from an oil pan of the engine 10 through a strainer on the engine block 14 to the filter 32 on the equipment rack 12. From the filter 32, the oil flows to the oil cooler 30 and then to a pressure side of the strainer housing on the engine 10 where it is forced back into the engine 10 by a pressure pump. The fuel pump 34 on the equipment rack 12 selectively pumps fuel from a fuel supply tank to a manifold assembly 38 on the engine 10 which distributes the fuel to the mechanical fuel injectors 18. A fuel filter is preferably provided at the fuel pump 34. A fuel supply line 40 connects the fuel pump 34 to the manifold assembly 38. A fuel return line 42 connects the manifold assembly 38 to the fuel supply tank to return residual fuel in the manifold 38. The engine coolant expansion tank 36 is part of an engine cooling system which includes coolant manifolds on the engine 10 for cooling the engine cylinders 16 during operation. Coolant is pumped from the expansion tank 36 to the manifold and back by engine 10 mounted water pumps. The expansion tank 36 typically includes a sight glass, a filler and pressure cap, and a low coolant level switch.

Figure 1A:
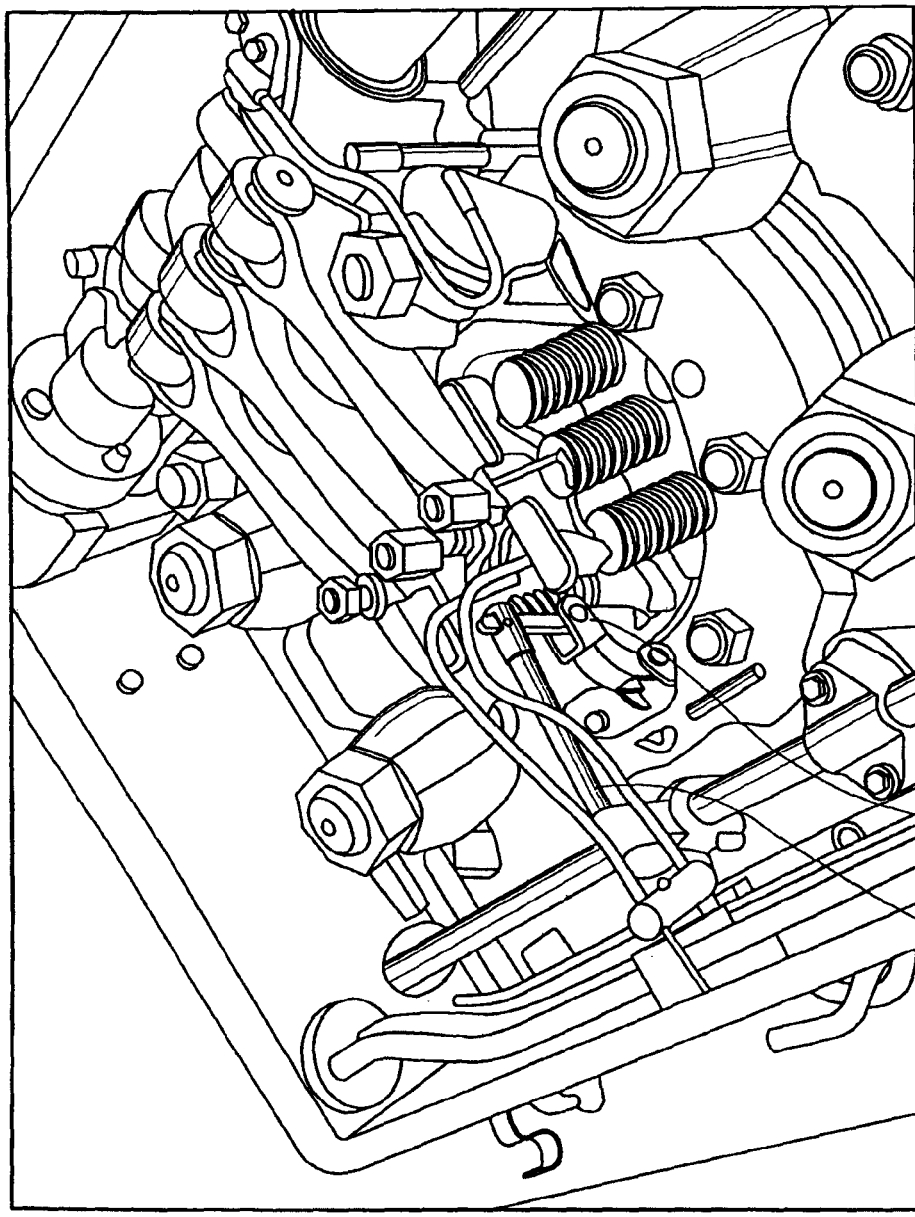
FIG. 1A is a perspective view showing mechanical control components of the engine of FIG. 1.
Figure 1B:
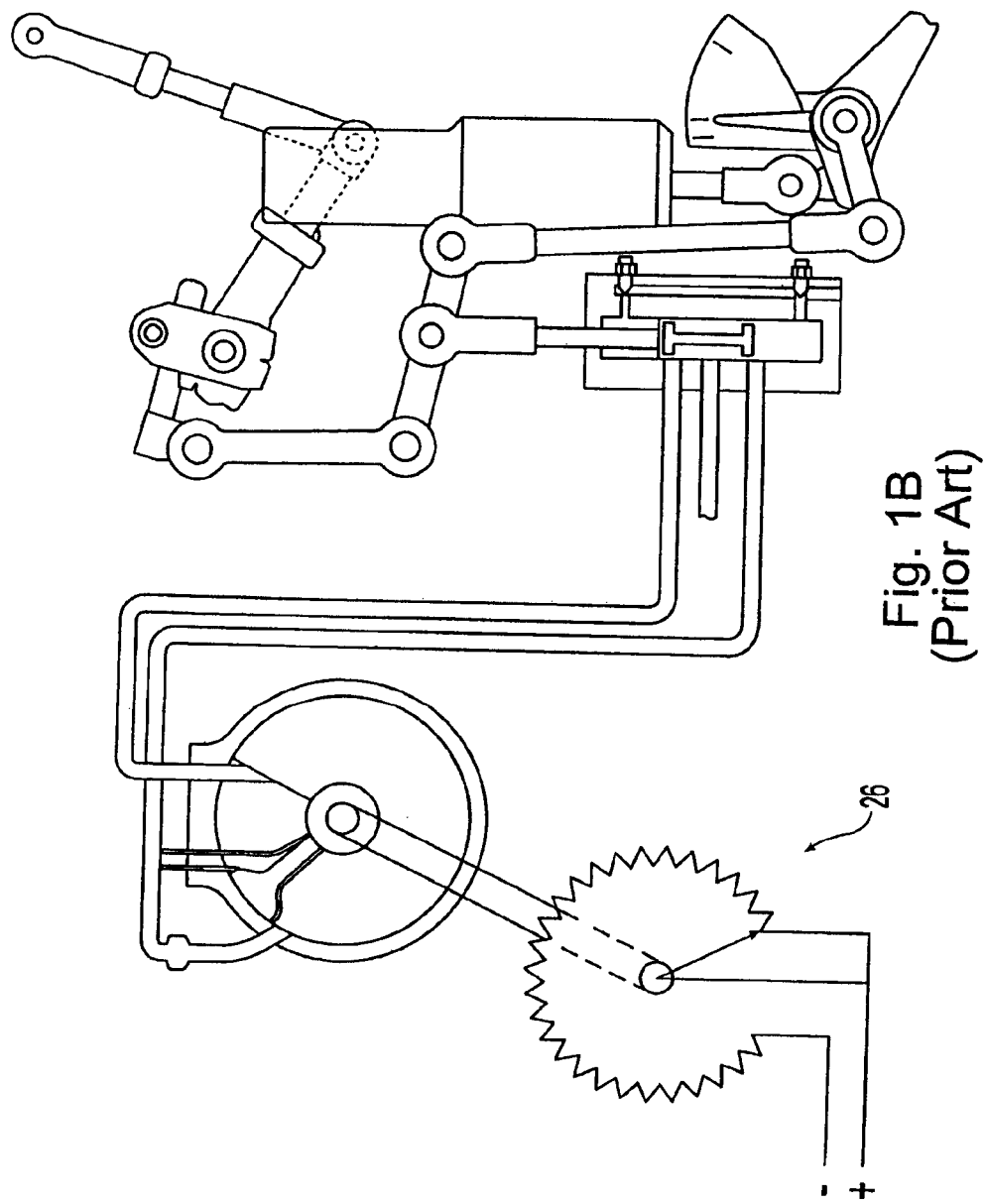
FIG. 1B is a diagrammatic view of a load regulator of the engine of FIG. 1.
Figure 2:
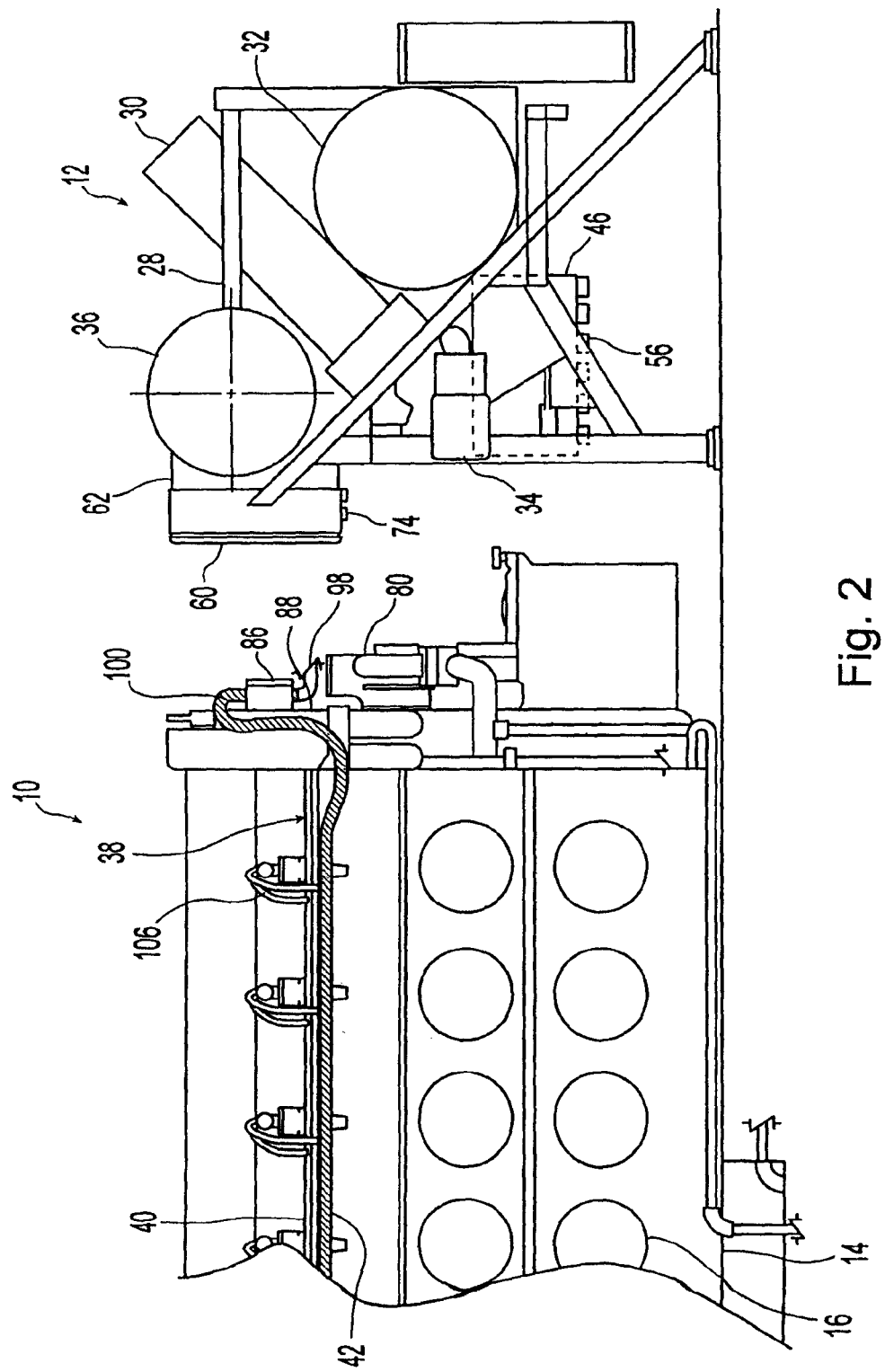
FIG. 2 is a diagrammatic view of the two-cycle diesel engine of FIG. 1 after it has been retrofitted with an electronic fuel injection system according to the present invention.

FIG. 2 shows the two-cycle mechanically-injected diesel engine 10 of FIG. 1 retrofitted to a two-cycle electronically-injected diesel engine according to the system and method of the present invention. The retrofit method includes the steps of removing the mechanical governor 20, the rack and associated linkage 22, the mechanical fuel injectors 18, the over speed trip linkage and lay shaft assembly 24, and the mechanical load regulator 26 from the engine (best shown in FIGS. 1, 1A, and 1B). A governor angle drive housing 44 is also removed from the engine 10.

As best shown in FIG. 3, a controller or electronic control module 46 is secured to the equipment rack 12. The illustrated controller 46 is installed on the left side (the coolant tank sight glass side) of the equipment rack 12. To secure the illustrated controller 46 to the equipment rack 12, a mounting plate 48 substantially the same size as the controller 46 is welded to the support structure 28. The controller 46 is then attached to the mounting plate 48. The illustrated mounting plate 48 is a planar rectangular plate with four threaded studs 50 (best shown in FIGS. 4 and 5). The mounting plate 48 can be, for example, a 0.25 inch thick steel plate. The threaded studs 50 extend through mounting lugs of the controller 46 and cooperate with threaded nuts 52 for removably attaching the controller 46 to the mounting plate 48 fixed to the equipment rack 12. It is noted that any other suitable attachment means can alternatively be utilized. The illustrated controller 46 has user interface controls 54 located so that they are clearly visible from the walkway between the engine 10 and the equipment rack 12. The illustrated controller 46 is provided with electric connectors 56 facing in a downward direction for ease of installing and removing electrical connections.

The controller 46 is provided with processing means and memory means. The controller 46 is electrically connected to electronic unit fuel injectors 58 and delivers an electronic injection signal to the electronic unit fuel injectors 58 (best shown in FIG. 6). The controller 46 is provided with software which programs the controller 46 to improve the emissions performance of the engine 10. The electronic control module 46 is preferably programmed to provide multiple injection events 59 (combinations of pre-injection 59A, main injection 59B, post injection 59C) during a single combustion period to improve emissions performance. FIG. 7A illustrates a post injection %9C after a main injection 59B. The post-injection 59C causes a small amount of fuel to be injected into the cylinder 16 after the main injection 59B to optimize combustion through extended combustion cycles and resulting emissions reduction. FIG. 7B illustrates a pre-injection 59A prior to the main injection 59B. The pre-injection 59A causes a small amount of fuel to be injected into the cylinder 16 early in the combustion cycle to optimize combustion through peak firing pressure and emissions reduction. The injection events 59 during a single combustion period can be evaluated and applied at each engine operating point to achieve optimum emissions performance. Thus, the various engine operating points will utilize different injection events 59 including one or two pre-injections 59A with a main injection 59B and no post injections 59C, a main injection 59B with no pre-injections 59A or post injections 59C, a main injection 59B with one or two post injections 59C and no pre-injections 59A, or a main injection 59B with one or two pre-injections 59A and one or two post injections 59C. Various combinations of injection events 59 throughout the operating range of the engine 10 are determined to achieve the most effective emissions reduction while maintaining efficient engine operation for the specific engine 10 and the controller 46 is programmed accordingly.

Programming of the electronic control module 46 is customized for each engine operating point to achieve an improved emissions performance for a given duty-cycle. Locomotives have either switch duty-cycle for operating in local yards arranging cars for their primary purpose or line haul duty-cycle for operating across the country for long distance deliveries. Marine typically has power rating duty-cycles consisting of four operating points of varying speed and horsepower. Generators have fewer operating points. The EPA weights these operating points depending on the frequency of operation at a given point. Switch locomotives will spend the majority of their time in idle or lower notches compares to line haul locomotives which will spend the majority of their time in the maximum horsepower notches. The software is customized for the application by optimizing different run-points so that the weighted results achieve the desired emissions.

Figure 8:
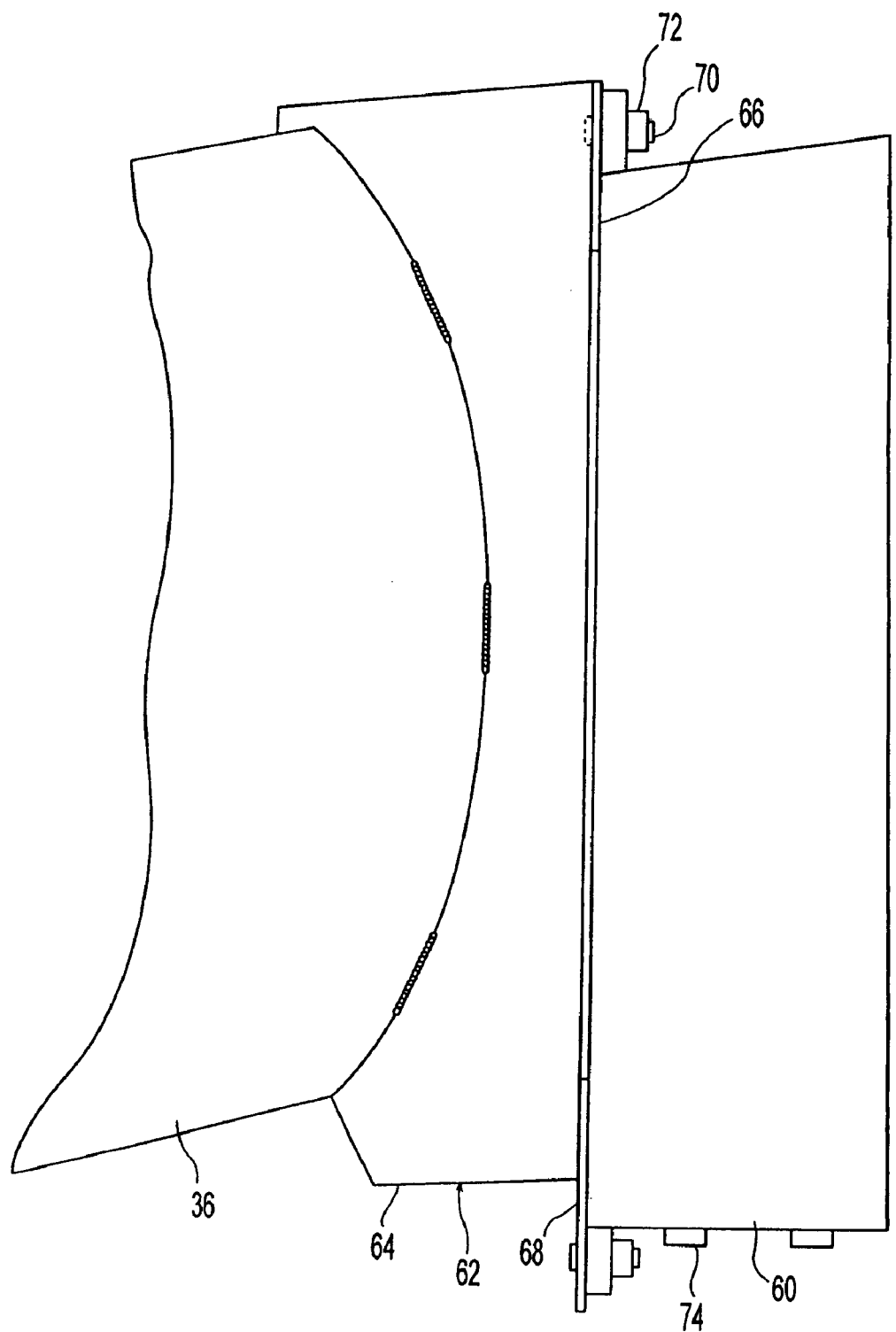
FIG. 8 is a fragmented, perspective view of an electronic governor box of the retrofitted engine of FIG. 2.
Figure 9:
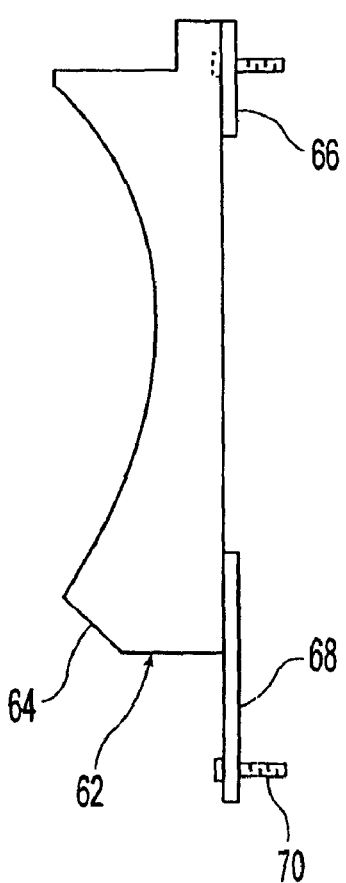
FIG. 9 is a side elevational view of a mounting bracket for the electronic governor box of FIG. 8.
Figure 10:
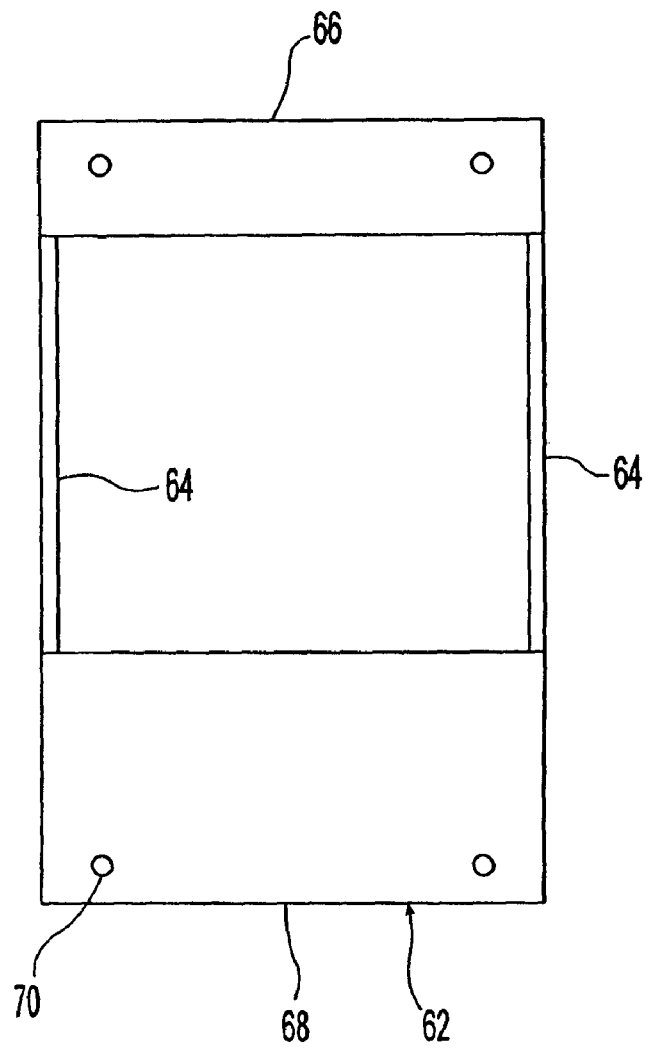
FIG. 10 is a front elevational view of the mounting bracket of FIG. 9.

As best shown in FIG. 8, an electronic governor box or module 60 is secured to the equipment rack 12. The illustrated electronic governor box 60 is installed directly to the coolant tank 36 on the equipment rack 12. To secure the governor box 60 to the coolant tank 36, a mounting bracket 62 having a radius substantially the same size as the coolant tank 36 is welded to the coolant tank 36. The governor box 60 is then removably attached to the mounting bracket 62. The illustrated mounting bracket 62 has two side panels 64 each with a radius substantially the same size as the coolant tank 36 and upper and lower braces 66, 68 extending between the side panels 64 (best shown in FIGS. 9 and 10). The side panels 64 and braces 66, 68 can be, for example, formed from 0.25 inch thick steel plates and welded together. The braces 66, 68 are provided with four threaded studs 70 which extend through mounting lugs of the governor box 60 and cooperate with threaded nuts 72 for removably attaching the governor box 60 to the mounting bracket 62 which is fixed to the coolant tank 36 and the equipment rack 12. It is noted that any other suitable attachment means can alternatively be utilized. The illustrated governor box 60 is mounted so that it faces the walkway between the engine 10 and the equipment rack 12. The illustrated governor box 60 is provided with electrical connectors 74 facing in a downward direction for ease of installing and removing electrical connections.

Figure 6:
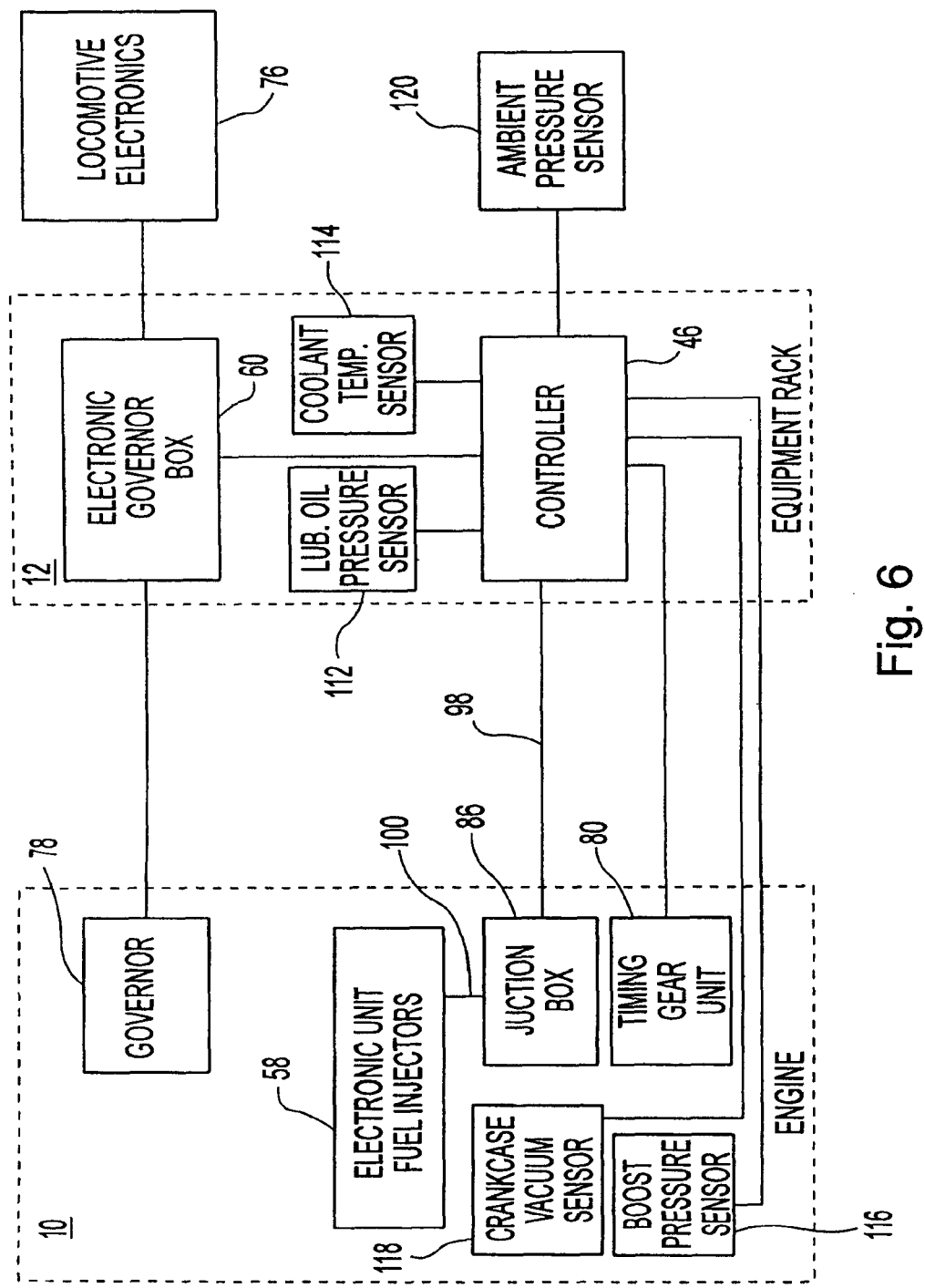
FIG. 6 is a diagrammatic view of electrical connections of the retrofitted engine of FIG. 2.
Figure 7B:
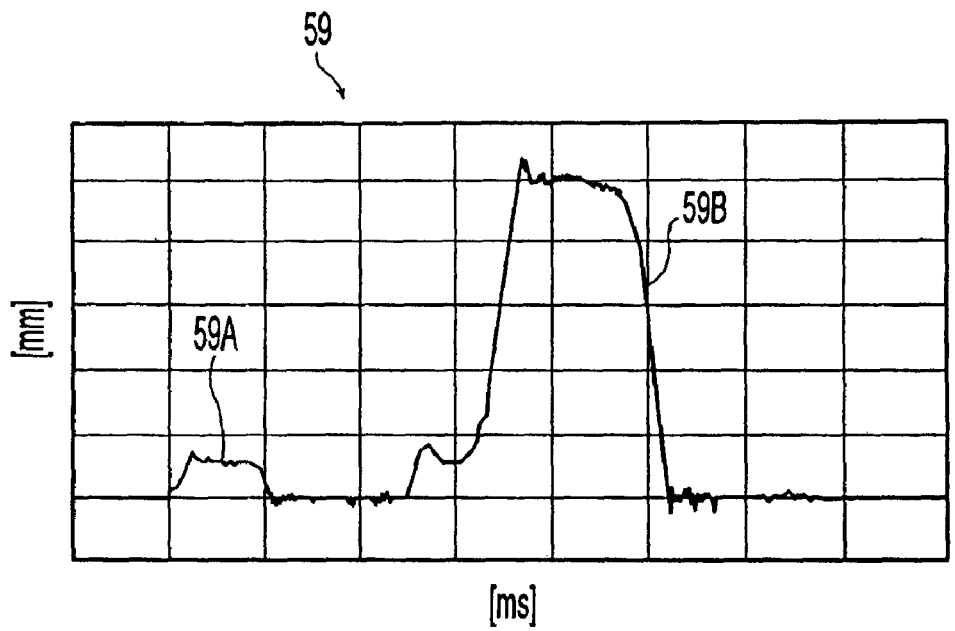
FIG. 7B is a graphical representation of alternative injection events for a combustion cycle of the retrofitted engine of FIG. 2.
Figure 7A:
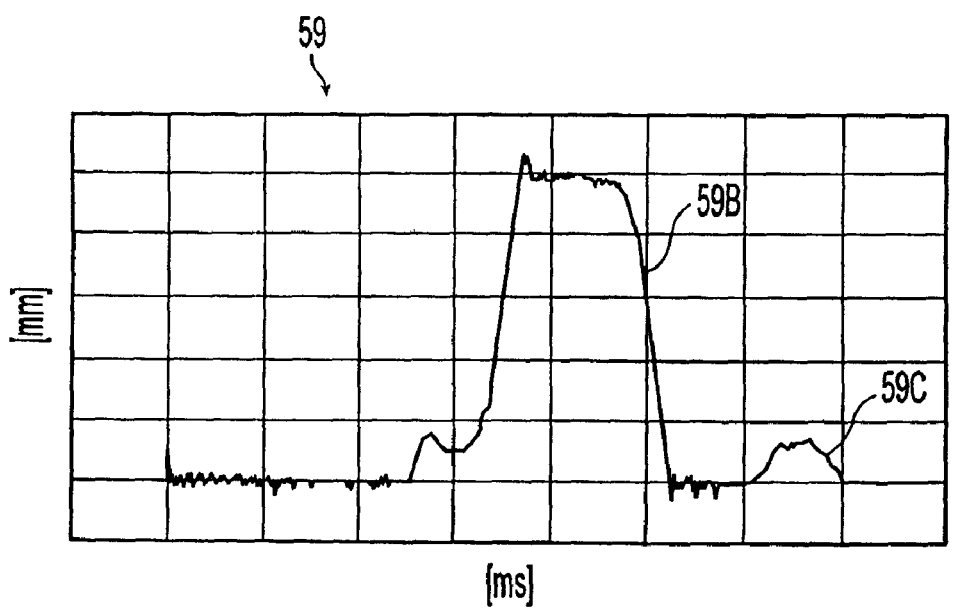
FIG. 7A is a graphical representation of injection events for a combustion cycle of the retrofitted engine of FIG. 2.

As best shown in FIG. 6, the electronic governor box 60 is electrically connected to the existing locomotive electronics 76 in order to replicate only the mechanical load regulator 26. The electronic control module 46 is electrically connected to the governor 78 through the electronic governor box 60 and determines excitation of the governor 78. As the governor 78 is excited, it creates resistance to determine horsepower. Fuel is supplied to maintain the given RPM based on the horsepower. Horsepower is determined by varying the excitation voltage and maintaining the RPM for a given excitation. For example, at idle there would be no excitation voltage since the only power is that required to keep the engine at speed. At full horsepower the excitation voltage would be at maximum to create the largest resistance on the engine.

Figure 12:
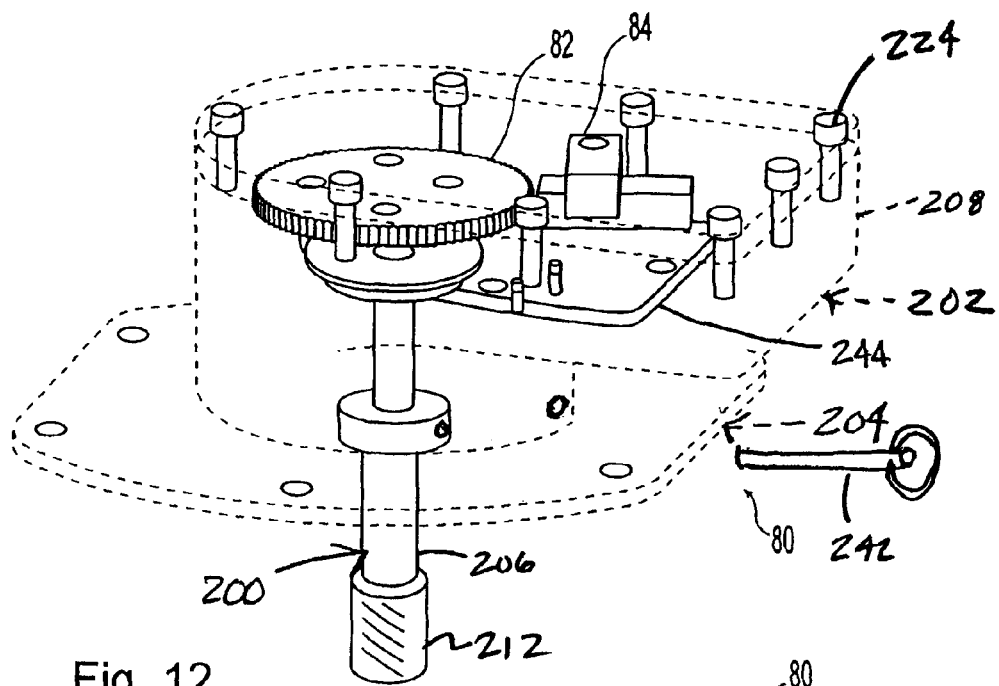
FIG. 12 is an exploded perspective view of the timing gear unit of FIG. 11 with some components in dashed lines and some components removed for clarity.
Figure 11:
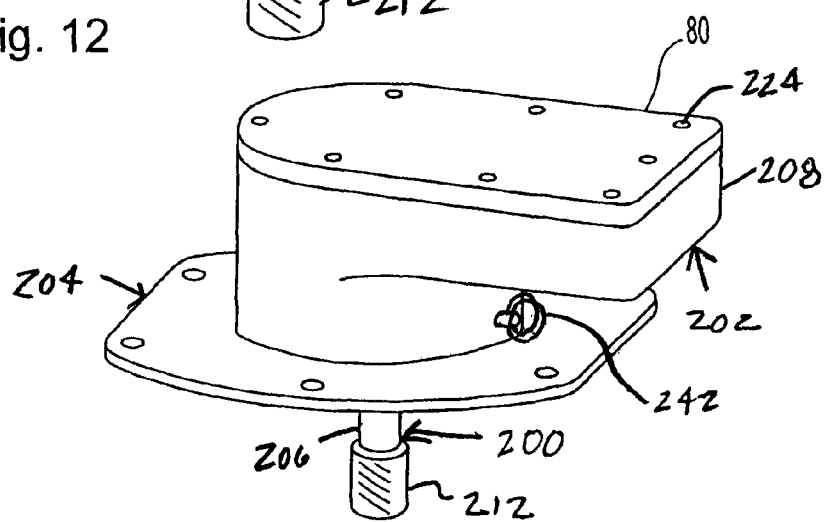
FIG. 11 is a perspective view of timing gear unit of the retrofitted engine of FIG. 2.
Figure 12A:
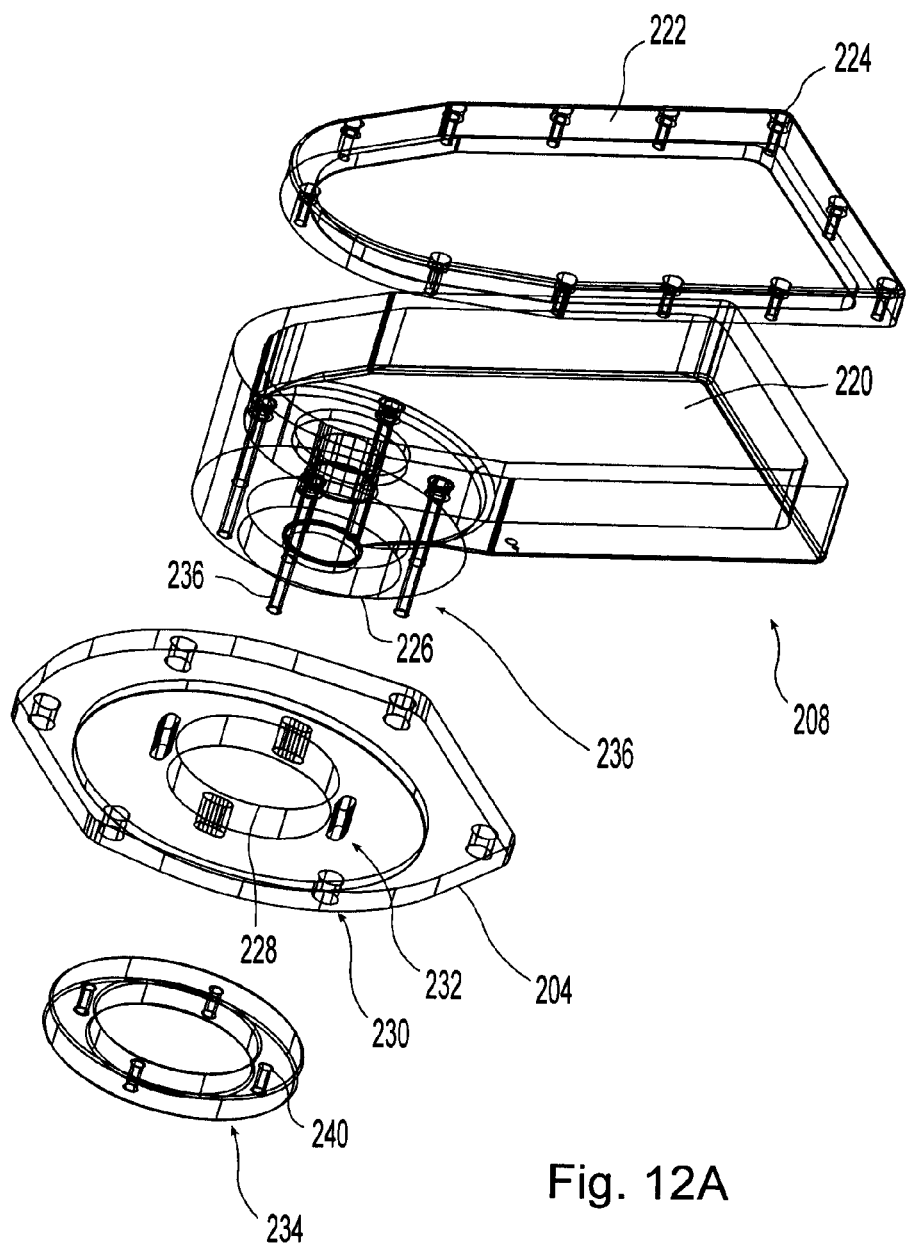
FIG. 12A is another exploded view of the timing gear unit of FIGS. 11 and 12 with some components removed for clarity.
Figure 12B:
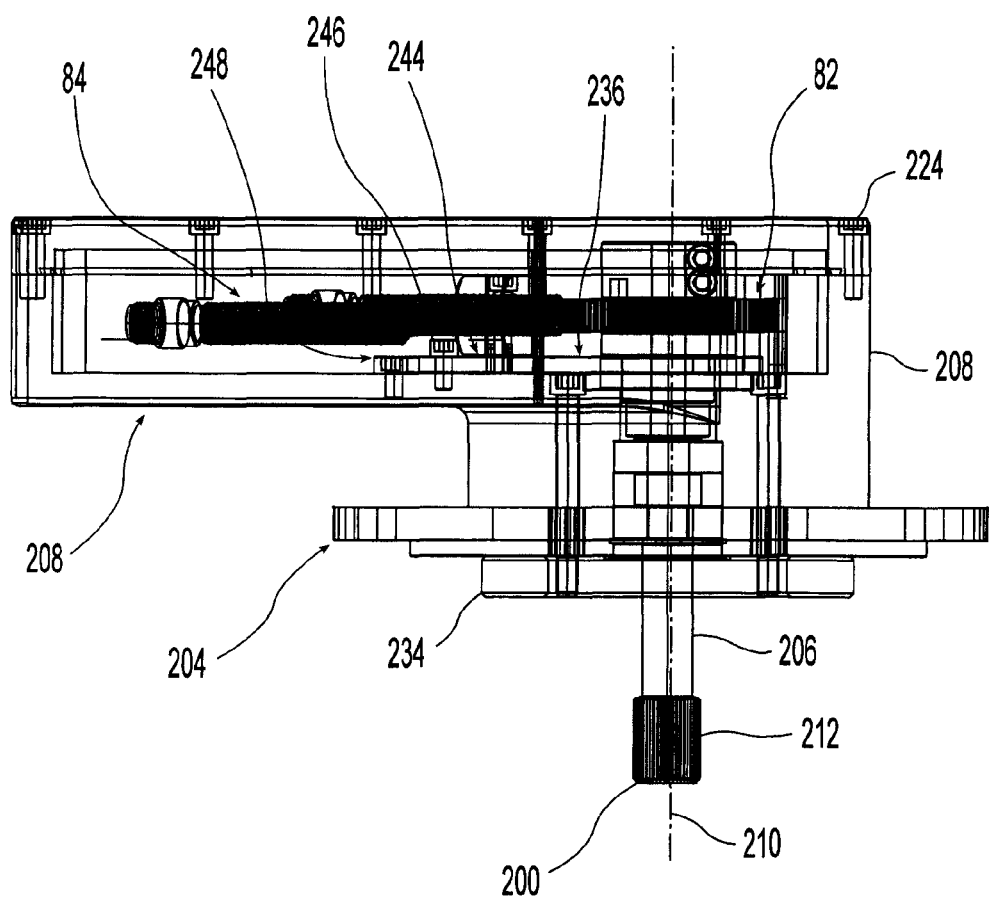
FIG. 12B is a side view of the timing gear unit of FIGS. 11 to 12A with some components removed for clarity.
Figure 12C:
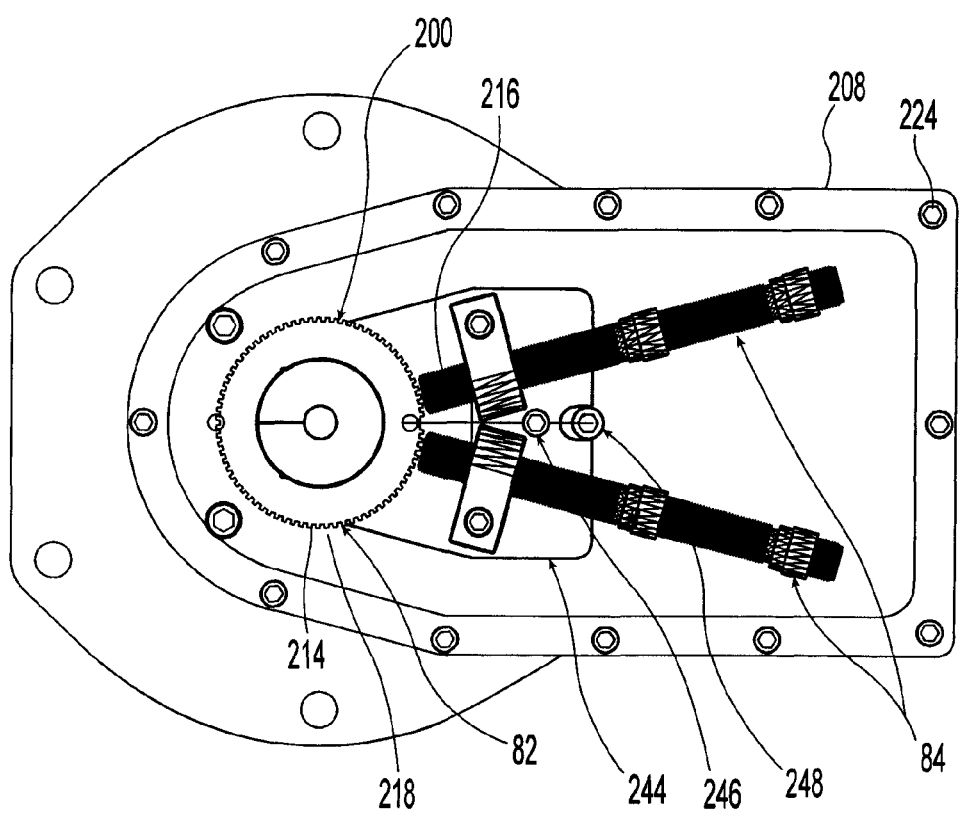
FIG. 12C is a top view of the timing gear unit of FIGS. 11 to 12B with some components removed for clarity.

An angle drive replacement timing gear unit or speed and/or position sensing device 80 is installed where the governor angle drive housing 44 was previously attached. The illustrated replacement timing gear unit 80 includes a timing gear 82 and at least one speed sensor 84 mounted internal to the unit 80 (best shown in FIGS. 11 to 12C). The illustrated timing gear unit 80 is attached with bolts but any other suitable attachment means can alternatively be utilized. The sensors 84 are connected to the controller 46 to determine angular position and rotational speed. The electronic control module 46 is programmed to utilize a signal from the speed sensors 84 of the timing gear unit 80 for an indicator of engine angular position to be used for timing the fuel injection. Alternatively, the electronic control module 46 can be programmed to utilize an engine flywheel for an indicator of engine angular position for fuel injection timing.

The illustrated timing gear unit 80 includes a spline shaft/timing gear subassembly 200, a sensor housing subassembly 202, and an adaptor plate 204. The spline shaft/timing gear subassembly 200 includes a spline shaft 206 which sized for insertion into the angle drive location of the engine so that the spline shaft 205 rotates with the engine and the timing gear 82 which is secured to the spline shaft 206 to rotate with the spline shaft 206 and is sized to rotate with the engine in a 1:1 ratio. The sensor housing subassembly 202 includes a sensor housing 208 and the at least one electronic sensor 84 which is located adjacent to the timing gear 82 to sense rotation of the timing gear 82 and is connectable to the electronic control module 46 to provide electronic signals to the electronic control module 46 for determining when to inject fuel with the electronic fuel injectors 58.

The illustrated spline shaft 206 has a vertically extending central axis of rotation 210. The lower end of the shaft 206 is provided with a spline 212 sized to cooperate with the female spline of the engine which previously received a spline of the angle drive 44 which is no longer needed due to the lack of a mechanical fuel injection system. The upper end of the shaft 206 is adapted to be secured to the timing gear 82 for mutual rotation about the vertical central axis 210.

Figure 12D:
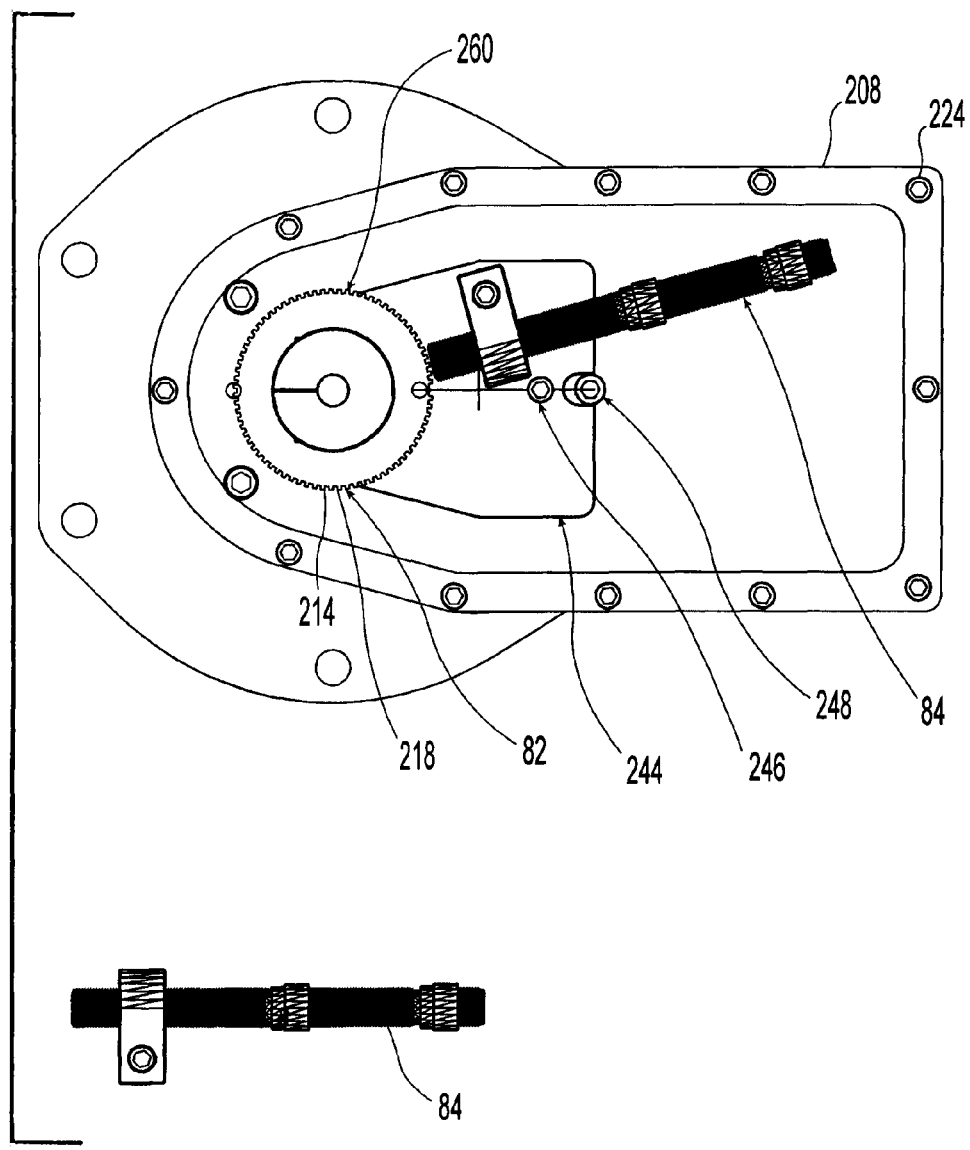
FIG. 12D is a top view similar FIG. 12C but showing an alternative configuration of the timing gear unit.
Figure 12E:
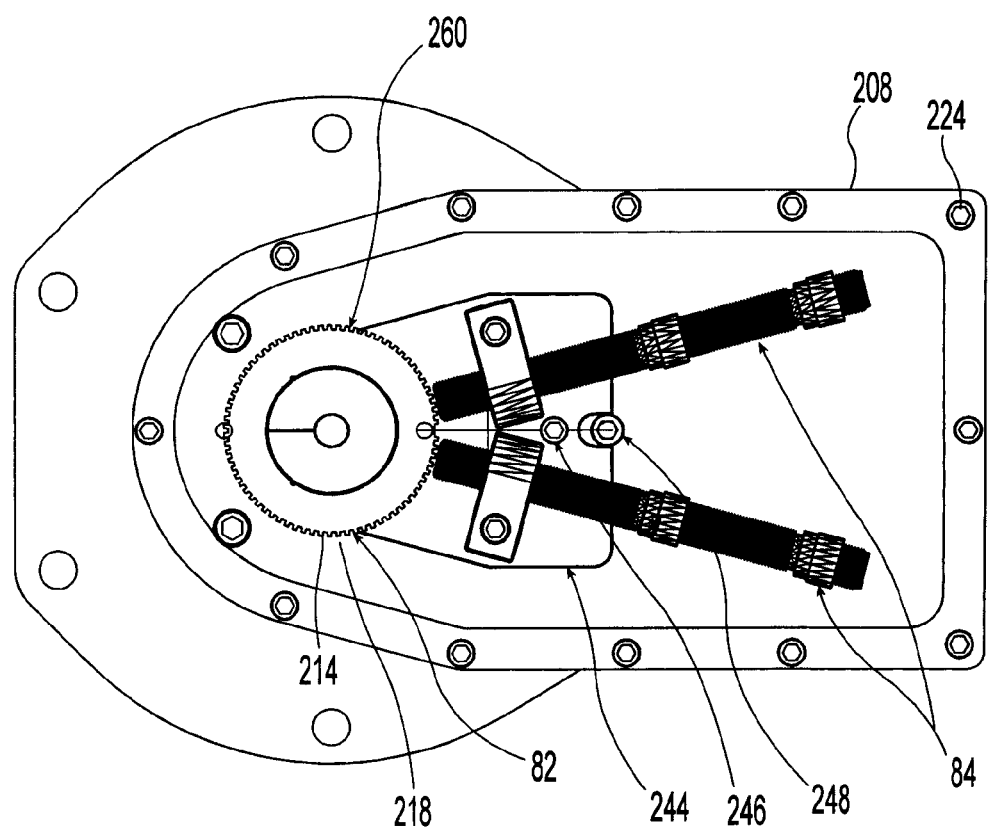
FIG. 12E is a top view similar FIGS. 12C and 12D but showing an another alternative configuration of the timing gear unit.

The illustrated timing gear 82 is has a vertical central axis and is secured to the upper end of the spline shaft 206 so that its central axis of rotation is coaxial with the central axis of rotation 210 of the spline shaft 206. The timing gear 82 has a plurality of outwardly disposed and spaced apart teeth 214 about its periphery. The timing gear 82 is sized so that it rotates with a 1:1 ratio with the engine crankshaft. That is, the timing gear 82 rotates exactly one revolution for each revolution of the engine crankshaft. The illustrated teeth 214 are equally sized and spaced to have seventy six of the teeth 214. However, one of the teeth 214 is not provided so that the timing gear has seventy five of the teeth and a large gap 216 at one location equal to the sum of two of the other gaps 218 and the width of one of the teeth 214. The large gap 216 can be utilized to indicate absolute position of the engine. However, the large gap 216 can be eliminated if the absolute position of the engine is determined in another manner such as, for example, either (1) proving a remote electronic sensor 84A at another rotating component of the engine such as at the engine flywheel (best shown in FIG. 12D) or (2) providing at least two of the electronic sensors 84 adjacent the timing gear 82 with one of the two electronic sensors 84 measuring multiple signals per revolution of the timing gear 82 to establish speed and the other of the two electronic sensors 84 measuring one signal per revolution of the timing gear 82 to establish absolute position (best shown in FIG. 12E). It is noted that any other suitable number of teeth 214 can alternatively be utilized. It is also noted that a large number of the teeth 214 is desirable for detection at low RPM, however, the total number of teeth 214 is limited by the diameter of the timing gear 82 and the tooth and gap widths needed for the sensor 84.

The illustrated sensor housing 208 forms an interior cavity 220 for housing the timing gear 82 and the sensors 84. The illustrated sensor housing 208 has an open top which is selectably closed by a cover 222. The illustrated cover 222 is secured to the sensor housing 208 using a plurality of mechanical fasteners 224 but it is noted that any other suitable means for releasably securing the cover 222 to the sensor housing 208 can alternatively be utilized. The sensor housing 208 is sized and shaped to rotatably support the vertically extending spline shaft 206 with the upper end of the shaft 206 supporting the timing gear 82 within the cavity 220 and the lower end of the shaft 206 locating the spline 212 outside the sensor housing 208.

The lower end of the sensor housing 208 is provided with a hub 226 for cooperation with the adapter plate 204. The illustrated adapter plate 204 has a central opening 228 sized for receiving the housing hub 226 such that the adapter plate 204 is rotatable relative to the sensor housing 208 about the housing hub 226. The adapter plate 204 has a first plurality of openings 230. The openings 230 are positioned to align with threaded mounting holes in the engine crankcase from which the angle drive 44 was removed. The illustrated first plurality of openings 230 is six openings but this may vary depending on the engine to which the timing gear unit is being installed. The adapter plate 204 also has a second plurality of openings 232. The openings 232 are sized and positioned to cooperate with a clamp plate 234 and a plurality clamp plate locking fasteners 236. The clamp plate locking fasteners 236 are spaced about the housing hub 226 and extend from the housing cavity 220 through openings in the housing 208 and the openings 232 in the adapter plate 204 to threaded openings 240 in the clamp plate 234. When the fasteners 236 are tightened, the adapter plate 204 is clamped between the housing 208 and the clamp plate 234 to prevent relative movement therebetween. When the fasteners 236 are loosened, the adapter plate 204 can rotate about the housing hub 226 relative to the housing 208 and the clamp plate 234. It is noted that rotation of the adapter plate 204 is limited by the length of the openings 232 which are preferably in the form of slots. The illustrated slots 232 are sized to permit the adapter plate 204 to rotate about 30 degrees but it is noted that any other suitable amount can alternatively be utilized. The illustrated housing 208 utilizes four fasteners 236 but it is noted that any other suitable quantity can alternatively be utilized.

A releasable lock 242 is preferably provided which releasably locks the timing gear 82 to the sensor housing 208 so that the position of the timing gear 82 relative to the sensor 84 can be maintained during installation. The illustrated lock 242 enables the shaft 206, and timing gear 82 secured thereto, to be locked to the sensor housing 208 during installation of the timing gear unit 80 to the engine and then unlocked for use once installed to the engine as described in more detail hereinafter. The lock 242 enables the timing gear unit 80 to be precisely preset at the factory using electronic feedback positioning sensors and then locked in place at the factory. This minimizes errors in field installations. The timing gear unit 80 is installed with free motion between the sensor housing 208 and the adapter plate 204 so that the spline shaft 206 can be inserted into the engine and the adapter plate 204 can be aligned with the engine crankcase mounting holes without changing the factory preset relationship between the timing gear 82 and the sensor 84. Then once installed, the sensor housing 208 and the adapter plate 204 are secured together. The timing and position is correct as long as the engine is lined up to 0 degrees when the spline shaft 206 is inserted into the engine. The illustrated lock 242 is a rigid pin that extends through an opening in the housing 208 and into an opening in the shaft 206. The pin is inserted into the openings to prevent relative rotation between the shaft 206 (with the timing gear 82 secured thereto) and the sensor housing 208 (with the sensor 84 secured thereto) during installation and selectively withdrawn to permit relative rotation between the shaft 206 and the sensor housing 208 once installed. It is noted that the shaft lock 242 can alternatively have any other suitable form such as, for example, a pawl engaging the timing gear teeth 214. It is also noted that the adaptor plate 204 need not be rotatable relative to the sensor housing 208 if the lock 242 directly engages the timing gear 82 and the timing gear 82 is releasably secured to the spline shaft 206 so that the spline shaft 206 is rotatable relative to the timing gear 82 during installation and then secured to the timing gear 82 after installation.

The electronic sensor 84 is located adjacent the timing gear 82 in order to sense passage of the timing gear teeth 214 and gaps 216, 218 as the timing gear 82 rotates. The electronic sensor 84 can be of any suitable type such as, for example, a hall effect sensor. A suitable Hall effect sensor is believed to be produced by Heinzmann. The illustrated timing gear unit 80 includes two of the electronic sensors 84 for redundancy. One of the two electronic sensors is a primary sensor and the other of two electronic sensors is a secondary sensor to be used if there is a failure with the primary electronic sensor. It is noted that the secondary electronic sensor 84 can be eliminated if redundancy is not desired. The illustrated two electronic sensors 84 are located about 40 degrees apart but any other suitable spacing can be alternatively utilized.

The illustrated electronic sensors 84 are secured to a sensor mounting plate 244 which is secured to the housing 208 within the cavity 220 by a plurality of mechanical fasteners 246. The illustrated sensor mounting plate 244 is a flat plate having a boss at its forward end that is located in a bore under the timing gear 82. This allows the mounting plate 244 to pivot about the central axis 210 of the timing gear 82 when the mechanical fasteners 246 are loosened. Precise adjustment is accomplished by turning an eccentric cam 248 located at the rear of the cam plate 244 when the mechanical fasteners 246 are loosened. The illustrated eccentric cam 248 can adjust the sensors 84 plus or minus 4 degrees from their nominal timing position but any other suitable amount can alternatively be utilized.

During installation of the timing gear unit 80 into the engine, the spline shaft 206 and the timing gear 82 are locked into position to the sensor housing 208 by the lock 242 in order to maintain alignment between the sensors 84 in the housing subassembly 202 and the timing gear 82 that is preset at the factory. The adapter plate 204 is loose so that it can rotate relative to the sensor housing 208. With the engine at 0 degrees, the timing gear unit 80 is oriented in an approximately vertical or upright position and is pushed downward into the crankcase where the female spline of the engine accepts the spline shaft 206 of the timing gear unit 80. The adaptor plate 204 is free to rotate in order to align the adaptor plate mounting holes 230 to the corresponding holes in the crankcase. Fasteners are then inserted and tightened to secure the adapter plate 204 to the crankcase. The housing cover 222 is removed from the sensor housing 208 and the fasteners 236 that attach the sensor housing 208 to the clamp plate 234 are tightened to clamp the adapter plate 204 therebetween. The lock 242 is then removed allowing freedom of rotation between the spline/shaft assembly 200 and the sensors 84 in the sensor housing subassembly 202. The cover 222 is replaced and wire couplings of the sensors 84 are connected to the electronic control module 46. The timing gear unit 80 is then ready for service.

The Illustrated timing gear unit 80 has the additional feature of allowing for mechanical adjustment of the sensors 84 and timing if required. The sensors 84 can be mechanically adjusted plus or minus 4 degrees from their nominal timing position. The illustrated embodiment allows for simultaneous adjustment of both of the sensors 84. The two illustrated sensors 84 are mounted on the sensor mounting plate 244 designed to precisely pivot around the timing gear 82. In order to manually adjust the sensors 84, you first remove the sensor housing cover 222 and then loosen the mechanical fasteners 246 securing the sensor mounting plate 244. Utilizing a timing light or other method for sensing position and timing, you rotate the eccentric cam 248 as needed to precisely reposition the sensor mounting plate 244 and the sensors 84 secured thereto. When the adjustment is complete, the mechanical fasteners 246 are tightened to lock the position of the sensor mounting plate 244 and the cover 222 is secured back onto the housing 208. This adjustment can be made when the engine is running.

Figure 14:
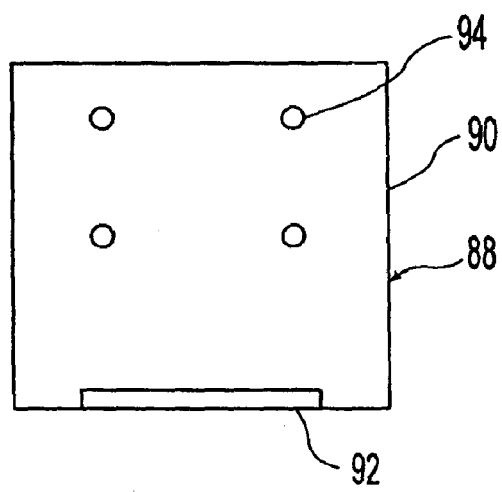
FIG. 14 is a front elevational view of the mounting bracket of FIG. 13.
Figure 15:
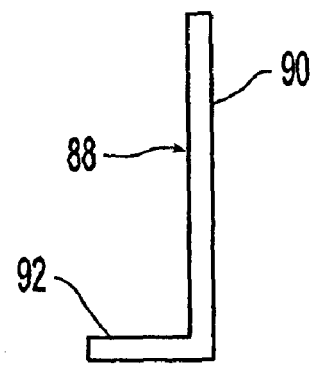
FIG. 15 is a side elevational view of the mounting bracket of FIGS. 13 and 14.
Figure 13:
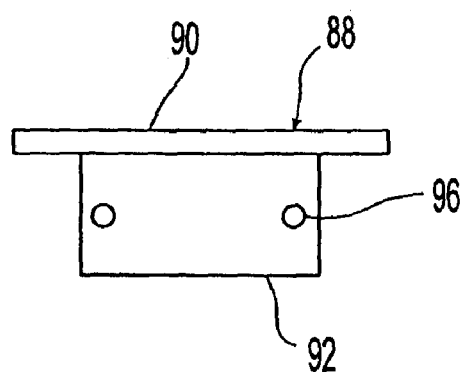
FIG. 13 is a top plan view of a mounting bracket for a junction box of the retrofitted engine of FIG. 2.

A fuel injector wiring junction box 86 is installed utilizing a mounting bracket 88 secured to the replacement timing gear unit 80. The illustrated mounting bracket 88 has a vertical main portion 90 and a horizontal bottom portion 92 perpendicularly extending from the lower end of the main portion 90 (best shown in FIGS. 13 to 15). The main portion 90 is provided with openings 94 for attachment of the wiring junction box 86 using bolts or other suitable fasteners. The bottom portion 92 is provided with openings 96 for attachment of the bottom portion 92 o the top of the timing gear unit 80 using bolts or other suitable fasteners. The mounting bracket 88 can be, for example, formed from 0.25 inch thick steel. The wiring junction box 86 can be of any suitable type for electrically connecting the wires 98 extending from the controller 46 with the wiring harness 100 extending from the electronic unit fuel injectors 58.

The unit electronic unit fuel injectors 58 are installed to the engine 10 in the locations where the mechanical fuel injectors 18 where removed. The electronic unit fuel injectors 58 are designed specifically for the type of engine 10 to which they are being installed. The electronic unit fuel injectors 58 preferably provide increased injection pressure and improved fuel atomization to improve emissions performance. Higher injection pressure can be used for better fuel atomization for less particulate matter creation during the combustion cycle and allows the timing to be retarded while still maintaining fuel economy.

The timing of the electronic unit fuel injectors 58 is set by moving the flywheel to the highest spot on the injector camshaft (the plunger of the injector will be depressed the maximum amount at this location). An adjuster screw on the rocker arm is then turned all the way down (fully depressing the plunger). Once the adjuster screw is bottomed out, it is reversed about 1.5 turns. Note that the highest spot on the injector camshaft may not match the timing plate for the engine 10 because it was originally designed for the mechanical fuel injectors 18. This is one possible method for setting the timing and other possible methods may be utilized to accomplish this task.

Figure 16:
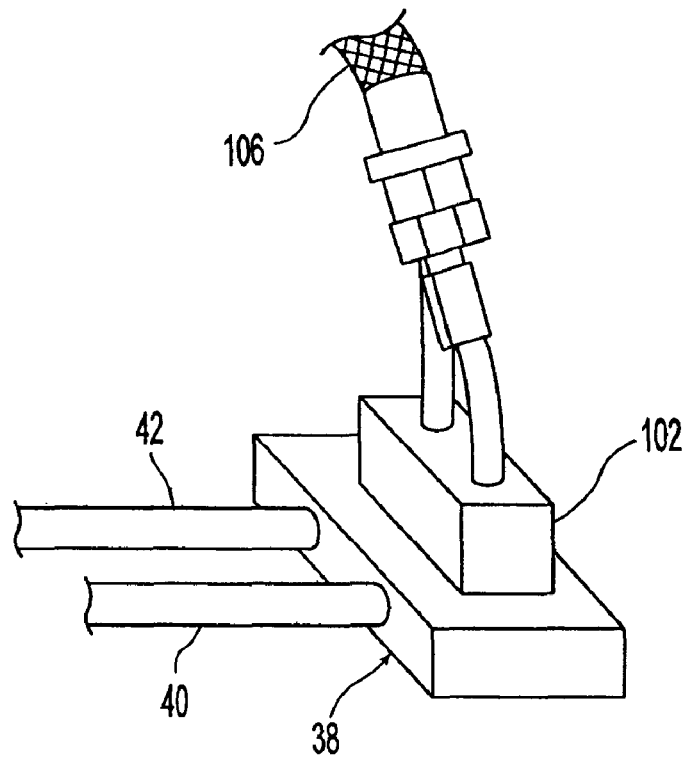
FIG. 16 is a perspective view of an adapter block connection of the retrofitted engine of FIG. 2.
Figure 17:
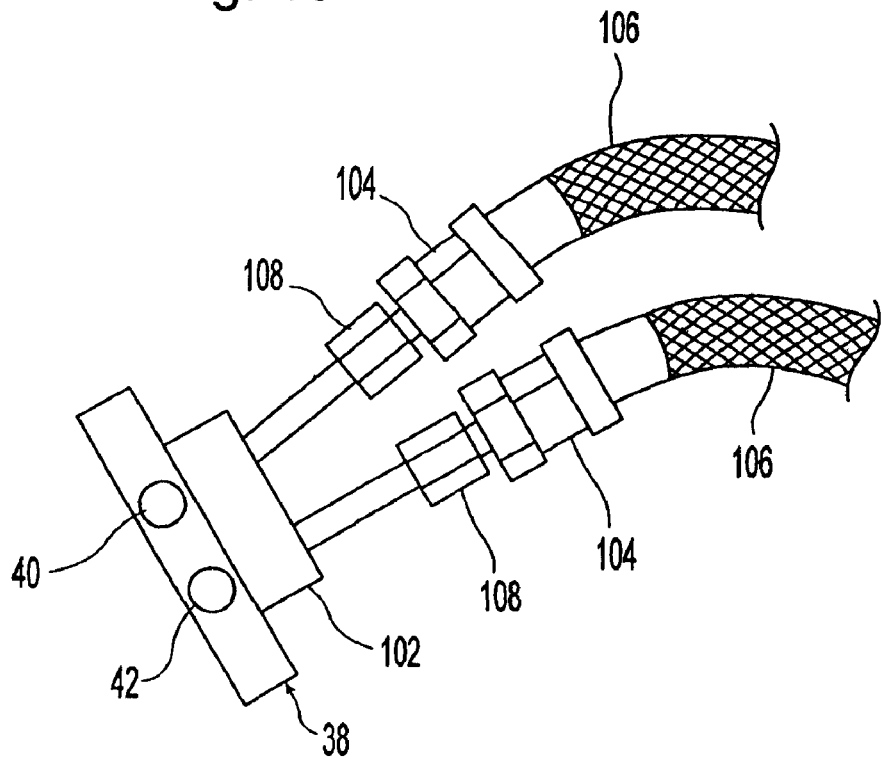
FIG. 17 is another perspective view of the adapter block connection of FIG. 16.

The electronic unit fuel injectors 58 are connected to the existing fuel manifold 38 which in turn is connected to the fuel pump 34 to supply fuel to the electronic unit fuel injectors 58. A first option for connecting the existing fuel manifold 38 is to attach an adapter block assembly 102 to the fuel manifold 38 which converts the existing fittings of the fuel manifold to threaded fittings for the electronic unit fuel injectors 58 (best shown in FIGS. 16 and 17). The adapter block assembly 102 is attached to the existing fuel manifold 38 using existing bolt and nut connections. Threaded connectors 104 of flexible inlet and outlet fuel lines 106 of the electronic unit fuel injector 58 are then secured to two threaded fittings 108 of the adapter block assembly 102 so that they are in communication with the fuel supply and fuel return lines 40, 42. A separate adapter block assembly 102 is secured to the fuel manifold 38 for each of the electronic unit fuel injectors 58. It is noted that the existing manifold assembly 38 is not modified and used as is.

Figure 18:
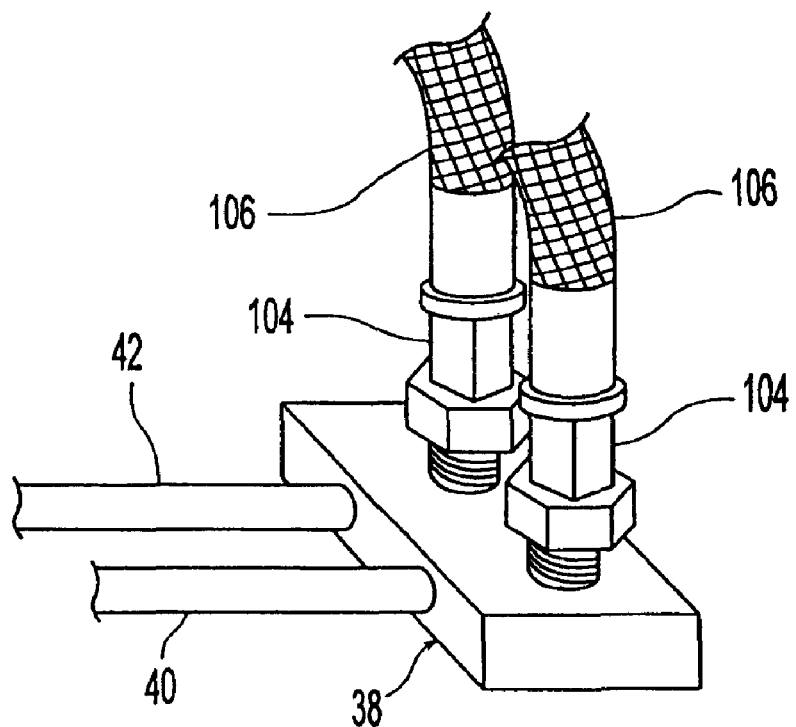
FIG. 18 is a perspective view of a direct fuel manifold connection of the retrofitted engine of FIG. 2.
Figure 19:
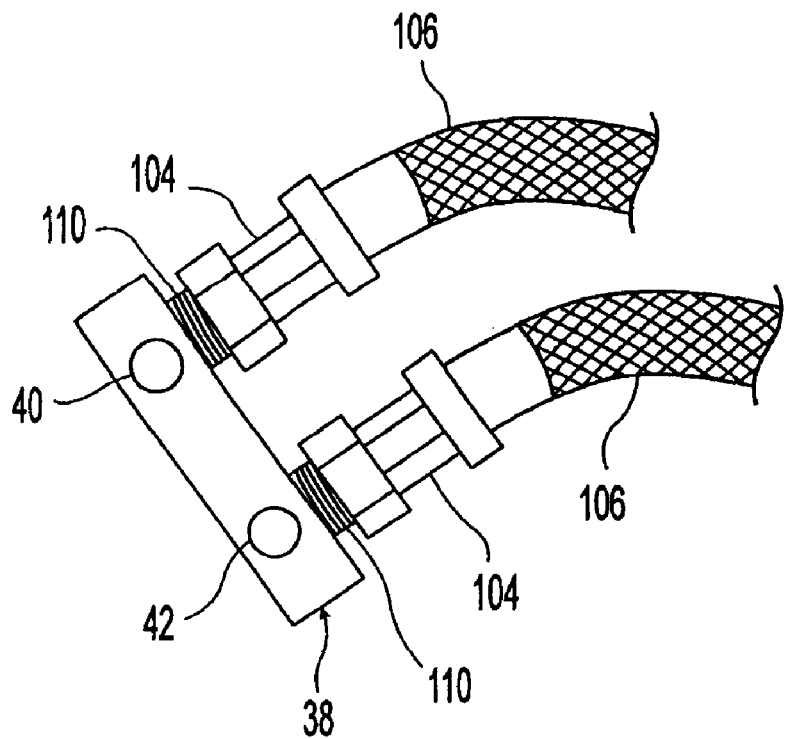
FIG. 19 is another perspective view of the connection of FIG. 18.

The second option for connecting the fuel manifold assembly 38 is to remove the existing fuel manifold header from the engine 10 and drill and tap holes in the manifold header that are sized for direct threaded connection of the connectors 104 of the inlet and outlet fuel lines 106 of the electronic unit fuel injectors 58 (best shown in FIGS. 18 and 19). The fuel manifold header is then reattached, threaded connectors 110 are directly threaded into the newly drilled and tapped holes, and the connectors 104 of the inlet and outlet fuel lines 106 of the electronic unit fuel injectors 58 are threaded onto the connectors 110. In this option, the existing manifold assembly 38 is modified to create a new threaded connection for the fuel lines 106 of the electronic unit fuel injectors 58.

A lubrication oil pressure sensor 112 is installed. The oil pressure sensor preferably has a range of about 0 to 200 PSI and an output signal of about 0 to 5 VDC, although other output signals and pressure ranges may be utilized to achieve the result. Supply voltage for the oil pressure sensor is supplied by the governor box 60. The oil pressure sensor 112 is electrically connected to provide the output signal to the electronic control module 46. The oil pressure sensor 112 is installed near the input for the existing analog gage so that electronic control module 46 receives a signal substantially similar to the readout so the operator sees on the analog gage.

A coolant temperature sensor 114 is installed. The coolant temperature sensor 114 preferably has a range of about 0 to 220 F and an output signal of about 4 to 20 mA, although other output signals and temperature ranges may be utilized to achieve the result. Supply voltage for the coolant temperature sensor 114 is supplied by the governor box 60. The coolant temperature sensor 114 is electrically connected to provide the output signal to the electronic control module 46. The coolant temperature sensor 114 is preferably installed where it will have a substantially matched reading as the existing fan controller sensor. The electronic control module 46 has the capability to operate the fans, if needed, so an input signal similar to the input signal the existing fan controller is desired. The electronic control module 46 can be programmed to change operation of the engine operation based on engine temperature. It is noted that while the illustrated embodiment utilized coolant temperature to represent engine temperature, oil temperature, engine block temperature, or some other form of measurement can alternatively be utilized to determine engine temperature. Preferably, engine operation is changed when the engine 10 first starts in cold weather. The electronic control module 46 can alter the fuel injection to protect the engine 10 until it reaches normal operating temperature where the normal injection will resume.

A boost pressure sensor 116 is optionally installed. The boost pressure sensor 116 preferably has a range of about 0 to 30 PSI and an output signal of about 4 to 20 mA, although other output signals and pressure ranges may be utilized to achieve the result. Supply voltage for the boost pressure sensor 116 is supplied by the governor box 60. The boost pressure sensor 116 is electrically connected to provide the output signal to the electronic control module 46. The boost pressure sensor 116 may be installed at the engine left side #1 end behind the water pump at the engine oil pressure valve, although other methods are available to achieve the result.

A crankcase vacuum sensor 118 is optionally installed. The crankcase pressure sensor 118 preferably has a range of about 0 to 30 PSI absolute and an output signal of about 4 to 20 mA, although other output signals and pressure ranges may be utilized to achieve the result. Supply voltage for the crankcase pressure switch 118 is supplied by the governor box 60. The crankcase pressure switch 118 is electrically connected to provide the output signal to the electronic control module 46. The crankcase pressure sensor 118 may be installed at the lower crankcase or engine protection device. The electronic control module 46 can be programmed to monitor the crankcase vacuum to protect the engine 10 as required.

An ambient pressure sensor 120 is optionally installed. The ambient pressure sensor 120 preferably has a range of about 0 to 30 PSI absolute and an output signal of about 4 to 20 mA, although other output signals and pressure ranges may be utilized to achieve the result. Supply voltage for the ambient pressure sensor 120 is supplied by the governor box 60. The ambient pressure sensor 120 is electrically connected to provide the output signal to the electronic control module 46. The ambient pressure sensor 120 may be installed in the locomotive where it can measure ambient pressure. The electronic control module 46 can be programmed to change operation of the engine 10 based on altitudes, which is related to ambient pressure, to enhance emissions performance at varying altitudes. These changes may include horsepower alteration, injection operation, and engine operation modifications.

Finally, the fuel injector wiring harness 100 is installed between the electronic unit fuel injectors 58 and the junction box 86. The junction box 86 in turn is electrically connected to the electronic control module 46.

The retrofitted engine 10 preferably includes at least one power assembly component that has reduced oil consumption to enhance emissions performance. The majority of particulate matter is from lube oil versus diesel fuel. In order to achieve the low PM requirements it is beneficial to reduce the oil consumption within the engine. One method for achieving this is to modify the piston ring configuration to better control the oil. Reducing the amount of oil that is able to bypass the piston rings and eventually enter the exhaust has significant impact on PM reduction. Other options may include valve guide seal configurations, honing tolerances/patterns, etc.

A kit for reducing exhaust emissions from an existing EMD 567/645 two-cycle diesel engine 10 by retrofitting the engine 10 from mechanical fuel injection to electronic fuel injection can comprise a plurality of electronic unit fuel injectors 58 and an electronic control module 46 to be electrically connected to the electronic unit fuel injectors 58 for delivering electronic injection signals to the electronic unit fuel injectors 58 and programmed for operating the electronic unit fuel injectors 58 to improve emissions performance of the EMD 567/645 two cycle diesel engine 10.

From the foregoing disclosure and detailed description of certain preferred embodiments, it is apparent that the illustrated system and method extends the useful life of EMD 567/645 two-cycle diesel engines 10 without requiring an expensive overhaul or new replacement engine. It is also apparent that this unique retrofit strategy is relatively low cost, is relatively easy to apply, and provides enhanced emissions performance. It is believed that this system and method enables EMD 567/645 two-cycle diesel engines 10 to meet at least US EPA locomotive Tier 2 standards.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A device for sensing the speed of an EMD 567/645/710 two-cycle diesel engine having a crankcase housing a crankshaft, electronic fuel injectors, and an electronic control system for controlling the electronic fuel injectors, the device comprising:
a shaft sized for connection to the crankshaft of the engine so that the shaft rotates with the engine;
a gear operably secured to the shaft to rotate with the shaft and sized to rotate with the engine in a 1:1 ratio;
at least one electronic sensor located adjacent the gear to sense rotation of the gear and connectable to the electronic control system to provide electronic signals to the electronic control system for determining when to inject fuel with the electronic fuel injectors; and
an adapter plate for attachment to the engine crankcase and rotatable relative to the gear and the electronic sensor during installation so that the adapter plate can be aligned with the engine crankcase while maintaining positional relationship between the gear and the sensor during installation.

2. The device as claimed in claim 1, wherein the gear has at least one tooth missing to form a large gap for synchronization and absolute position monitoring using the electronic sensor.

3. The device as in claimed in claim 1, further comprising a lock for releasably locking the gear relative to the electronic sensor during installation.

4. The device as claimed in claim 1, further comprising an eccentric cam mechanism for adjusting for timing position of the electronic sensor without removal of the device from the engine.

5. The device as claimed in claim 1, further comprising a housing for the gear and the electronic sensor and sized and shaped to mount to a governor angle drive location of the engine.

6. The device as claimed in claim 1, wherein there are two of the electronic sensors, one of the two electronic sensors being a primary sensor and the other of two sensors being a secondary sensor to be used if there is a failure with the primary sensor.

7. The device as claimed in claim 1, wherein the gear has a plurality of teeth all being equally spaced and wherein there are two of the electronic sensors, one of the two electronic sensors measures multiple signals per revolution of the gear to establish speed and the other of the two electronic sensors measures one signal per revolution of the gear to establish absolute position.

8. The device as claimed in claim 1, wherein the at least one electronic sensor measures multiple signals per revolution of the gear to establish speed and further comprising at least one remote electronic sensor located remote from the gear and which measures another rotating location of the engine to establish absolute position.

9. A kit for reducing exhaust emissions from an existing EMD 567/645/710 two-cycle diesel engine having a crankcase housing a crankshaft by retrofitting the engine from mechanical fuel injection to electronic fuel injection, the kit comprising:
a plurality of electronic unit fuel injectors;
an electronic control module to be electrically connected to the electronic unit fuel injectors for delivering injection signals to the electronic unit fuel injectors; and
a device for sensing speed of the engine including:
a shaft sized for connection to the crankshaft of the engine so that the shaft rotates with the engine;
a gear operably secured to the shaft to rotate with the shaft and sized to rotate with the engine in a 1:1 ratio;
at least one electronic sensor located adjacent the gear to sense rotation of the gear and connectable to the electronic control module to provide electronic signals to the electronic control module for determining when to inject fuel with the electronic unit fuel injectors; and
an adapter plate for attachment to the engine which is rotatable relative to the gear and the electronic sensor during installation so that the adapter plate can be aligned with the engine while maintaining positional relationship between the gear and the sensor during installation.

10. The kite as claimed in claim 9, wherein the gear has at least one tooth missing to form a large gap for synchronization and absolute position monitoring using the electronic sensor.

11. The device as in claimed in claim 9, further comprising a lock for releasably locking the gear relative to the electronic sensor during installation.

12. The device as claimed in claim 9, further comprising an eccentric cam mechanism for adjusting for timing position of the electronic sensor without removal of the device from the engine.

13. The device as claimed in claim 9, further comprising a housing for the gear and the electronic sensor and sized and shaped to be mounted to a preexisting angle drive location of the engine.

14. The device as claimed in claim 9, wherein there are two of the electronic sensors, one of the two electronic sensors being a primary sensor and the other of two sensors being a secondary sensor to be used if there is a failure with the primary sensor.

15. The device as claimed in claim 9, wherein the gear has a plurality of teeth all being equally spaced and wherein there are two of the electronic sensors, one of the two electronic sensors measures multiple signals per revolution of the gear to establish speed and the other of the two electronic sensors measures one signal per revolution of the gear to establish absolute position.

16. The device as claimed in claim 9, wherein the at least one electronic sensor measures multiple signals per revolution of the gear to establish speed and wherein the device further includes at least one remote electronic sensor to be located remote from the gear and to measure another rotating location of the engine to establish absolute position.

17. A method for retrofitting an EMD 567/645/710 two-cycle diesel engine to reduce exhaust emissions, the method comprising the steps of:
(a) removing a governor angle drive housing from the engine;
(b) securing a device for sensing speed of the engine at a governor angle drive location of the engine, the device for sensing speed of the engine including a shaft sized for connection to a crankshaft of the engine at the governor angle drive location of the engine so that the shaft rotates with the engine, a gear operably secured to the shaft to rotate with the shaft and sized to rotate with the engine in a 1:1 ratio, at least one electronic sensor located adjacent the gear to sense rotation of the gear, and an adapter plate for attachment to the engine which is rotatable relative to the gear and the electronic sensor during installation so that the adapter plate can be aligned with the engine while maintaining positional relationship between the gear and the sensor during installation.

18. The method as in claimed in claim 17, further comprising the steps of locking the gear against movement relative to the electronic sensor prior to securing the device on the engine, inserting the shaft into the engine after the gear is locked and while the engine is at 0 degrees, and unlocking the gear to permit relative movement to the electronic sensor after inserting the shaft and securing the device to the engine.

* * * * *